United States Patent [19]

Brock et al.

[11] Patent Number: 5,220,473
[45] Date of Patent: Jun. 15, 1993

[54] MULTITRACK MAGNETIC HEAD ASSEMBLY HAVING A TAPE-ENGAGING SURFACE CONTOURED FOR CONTINUOUS IN-CONTACT RECORDING

[75] Inventors: George W. Brock, LaJolla; Wlodzimierz S. Czarnecki, Rancho Santa Fe, both of Calif.

[73] Assignee: Eastman Kodak Company, Rochester, N.Y.

[21] Appl. No.: 697,047

[22] Filed: May 8, 1991

[51] Int. Cl.⁵ .................................. G11B 5/265
[52] U.S. Cl. .................................. 360/121; 360/122
[58] Field of Search .................. 360/121, 122, 127

[56] References Cited

U.S. PATENT DOCUMENTS

| | | | |
|---|---|---|---|
| 4,191,980 | 3/1980 | King et al. | 360/122 |
| 4,373,173 | 2/1983 | Robinson et al. | 360/121 |
| 4,527,212 | 7/1985 | Ricards | 360/122 |
| 4,531,170 | 7/1985 | Takei et al. | 360/122 |
| 4,636,898 | 1/1987 | Suzuki et al. | 360/122 |
| 4,695,909 | 9/1987 | Momata et al. | 360/121 |
| 4,910,629 | 3/1990 | Mitsuhashi et al. | 360/121 |
| 4,916,563 | 4/1990 | Kawase | 360/122 |
| 4,939,835 | 7/1990 | Coutellier et al. | 360/122 |
| 4,959,741 | 9/1990 | Ota et al. | 360/122 |
| 4,985,796 | 1/1991 | Ihara et al. | 360/122 |

Primary Examiner—A. J. Heinz
Attorney, Agent, or Firm—Dennis P. Monteith; William W. Holloway

[57] ABSTRACT

A multitrack head assembly has a plurality of magnetic heads arranged side-by-side along a transducing gap line extending across an upwardly facing tape-engaging surface which includes a series of elongated coplanar ribs alternating with low-pressure channels on both sides of and orthogonal to the gap line. For continuous in-contact recording, each rib is aligned with a particular one of the magnetic heads and has a width that is greater than the width of the transducing gap of the head with which it is aligned; furthermore, each rib has a gently curved tape-engaging surface with a radius of curvature $R_1$ in a direction orthogonal to the gap line and a radius of curvature $R_2$ in a direction substantially parallel with the gap line, where $R_1$ and $R_2$ are not necessarily the same.

3 Claims, 3 Drawing Sheets

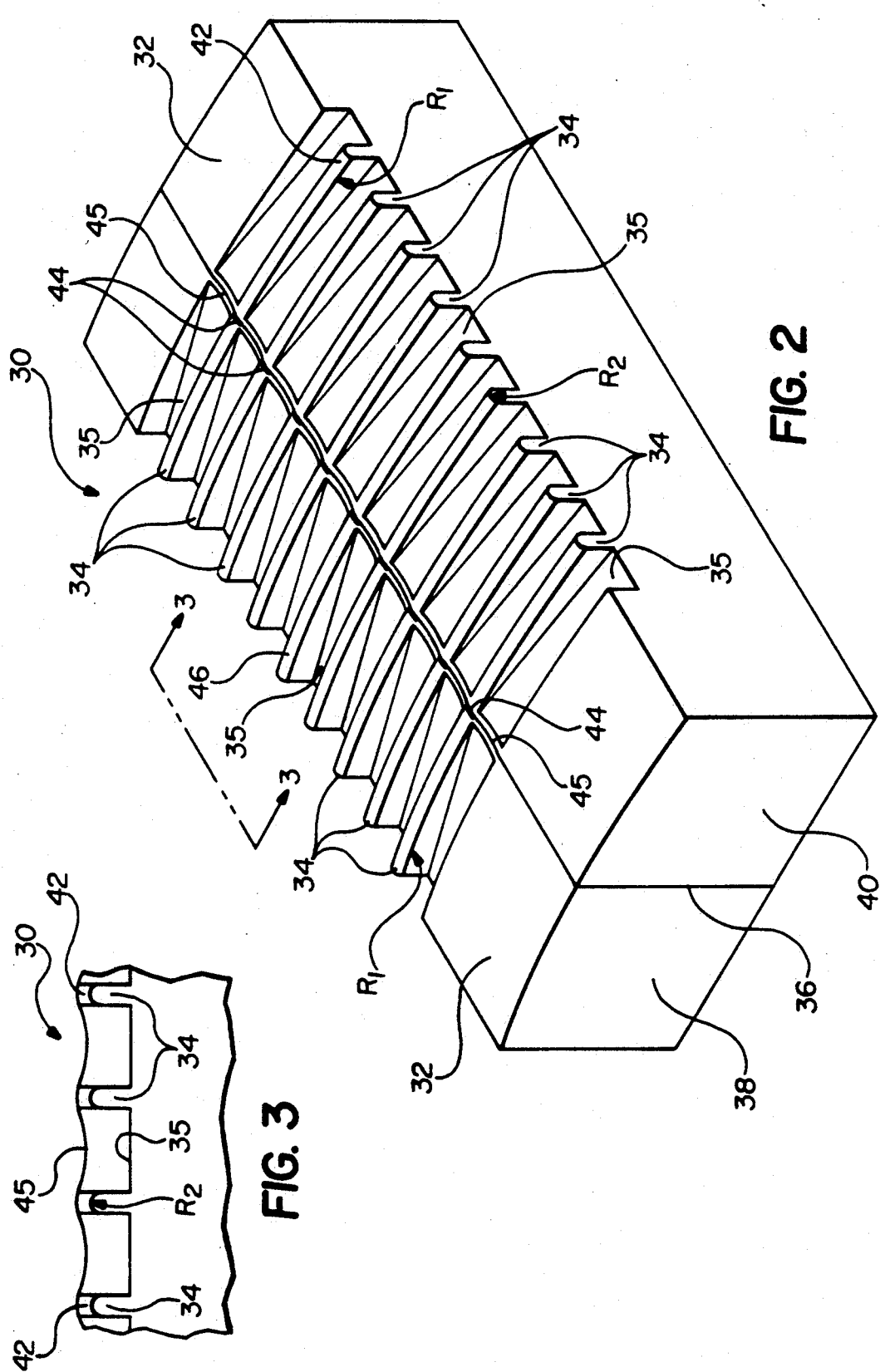

MULTITRACK MAGNETIC HEAD ASSEMBLY HAVING A TAPE-ENGAGING SURFACE CONTOURED FOR CONTINUOUS IN-CONTACT RECORDING

BACKGROUND OF THE INVENTION

1. Field Of The Invention

The present invention relates generally to magnetic recording apparatus. More specifically, the present invention relates to a multitrack magnetic head assembly for in-contact linear recording.

2. Description Of The Prior Art

In the following description of relevant prior art, reference is made to FIG. 1 of the accompanying drawings, which is a perspective view of a multitrack magnetic head assembly 10 known in the art.

Before addressing structural features and specific limitations of the head assembly 10, reference is made to the fact that the transducing gap of a magnetic head, where possible, should be placed in contact with its associated recording medium to enhance the strength of the signal recorded on or played back therefrom. This is particularly important in an application involving the recording of short-wavelength signals wherein it otherwise would be imperative that intimate contact be maintained at a media-to-head interface to minimize spacing losses.

Referring now to FIG. 1, the head assembly 10 includes complementary half-sections 12a and 12b formed of a bulk magnetically soft material of good wear characteristics such as nickel iron ferrite. The half-sections 12a, 12b, which are commonly cemented together, cooperatively define an upwardly facing surface 13 which has a series of slots (not shown) at an interface 14 between the half-sections. At the end of these slots and between sections 12a and 12b are deposited flat conductive coils which together with the soft magnetic material of 12a and 12b form a series of hybrid thin film heads 16 in a side-by-side configuration with their respective transducing gaps substantially in alignment with the interface 14. A series of elongated parallel ribs 20 alternating with somewhat wider channels 21 is located on each side of the interface 14, extending orthogonal thereto. The ribs 20 function to support magnetic tape on the leading side and the trailing side of each head 16. For that purpose, each rib 20 is gently curved in the direction orthogonal to the interface 14. In the direction parallel with the interface 14, however, the tape-engaging surface of each rib 20 is substantially flat, forming a right angle with rib sidewalls 22, as shown in FIG. 1.

The channels 21, in each half of the head assembly 10, are aligned with the magnetic heads 16 and serve to form low-pressure regions at the head element such that a thin air bearing ensues at that part of the tape engaging surface.

In order to accommodate the magnetic heads 16 between opposing channels 21, the upwardly facing surface 13 includes an elongated relatively wide continuous land area 24 on both sides of the interface 14. The land area 24 has the same curvature as the ribs 20 in the direction orthogonal to the interface 14.

Although the head assembly 10 performs acceptably for relatively long wavelength applications, recording/playback performance has performed less well for relatively short wavelength applications. We have found that the reason for this is the head assembly 10 does not provide satisfactory contact with magnetic tape. This, of course, results in spacing losses which for a given spacing are more severe for short-wavelength signals than for longer wavelengths.

We believe these spacing losses arise from at least two factors. First, the contour of the upwardly facing surface 13 itself causes tape to at least not be in continuous contact with all transducing gaps of all magnetic heads 16 all the time. Second, we have found that the channels 21 between adjacent ribs 20 tend to collect contamination from tape oxide formulations. This "debris" results in local interference with compliance of tape with the surface 13 of the head assembly.

SUMMARY OF THE INVENTION

In view of the foregoing, an object of the invention is to provide a multitrack head assembly in which head-to-media contact is continuous during recording and/or playback operations. This object is achieved with a multitrack head assembly of the type having a plurality of magnetic heads arranged side-by-side along a transducing gap line extending across an upwardly facing surface which includes a series of elongated coplanar ribs alternating with low pressure channels on both sides of and orthogonal to the transducing gap line. In a presently preferred embodiment of the invention, however, each rib is aligned with a particular one of the magnetic heads, and has a gently curved tape-engaging surface with a radius of curvature $R_1$ in a direction orthogonal to the transducing gap line and a radius of curvature $R_2$ in a direction substantially parallel with the transducing gap line, where $R_1$ and $R_2$ are not necessarily the same.

We have found that the "flying height" of tape is controlled to a large extent by the width of the ribs, and also by the radii $R_1$ and $R_2$. The width of a rib is a function of tape tension, thickness, and velocity. Specifically, we have found that in-contact recording occurs when each rib is gently curved in each of two orthogonal directions, so as the tape comes into contact with a rib the air pressure build-up is bled into the adjacent channels. To those ends, the curvatures $R_1$ and $R_2$ of the ribs are preferably achieved by diamond tape lapping.

For that process, the width of the land separating corresponding channels on opposite sides of the gap line is made as narrow as practical. This is because the wider the land the more difficult it becomes to lap and control the cross curvature $R_2$. With limited head-mounting space provided by a narrow land, it is preferred that each of the magnetic heads is of the thin film type. In a presently preferred embodiment, the width of each rib is 125 microns ($\mu$), the width of the land (the distance between opposing channels) is approximately 100 $\mu$, and the radii $R_1$ and $R_2$ are 12.5 mm and 19 to 40 mm respectively.

A multitrack magnetic head assembly in accordance with the invention is further characterized in that the land area, between adjacent magnetic heads along the transducing gap line, is of concave shape. Each region of concave curvature is brought about when diamond tape is wrapped around the crown of the corresponding ribs during lapping. Each concave region and the two channels on opposite sides thereof cooperatively define a low-pressure trough between adjacent pairs of ribs that extends in the direction of tape travel across the entire head assembly, from the front edge of the leading side to the back edge of the trailing side of the head assembly. Since each magnetic head is aligned between an opposing pair of ribs and not an opposing pair of channels, as is the case with the aforementioned prior art, debris, such as contamination from tape oxide formulations, is funnelled into these low-pressure troughs, away from the magnetic heads, and thereby prevented from interfering with head-to-tape contact.

These advantages, as well as other advantages, will become more apparent in the detailed description of a preferred embodiment presented below.

BRIEF DESCRIPTION OF THE DRAWINGS

The invention will be described with reference to the accompanying drawings, wherein:

FIG. 2 is a perspective view of a multitrack magnetic head assembly in accordance with the present invention;

FIG. 3 is an elevation view of the multitrack head assembly taken along the lines 3—3 of FIG. 2;

DETAILED DESCRIPTION OF A PREFERRED EMBODIMENT

An object of the present invention is to provide a multitrack magnetic head assembly in which continuous contact is maintained between the transducing gap of each magnetic head in the assembly and magnetic tape during a linear recording and/or playback operation. FIG. 2 shows a multitrack head assembly 30 in accordance with a presently preferred embodiment of the invention. A cursory view of the embodiment of FIG. 2 might lead one to conclude that the known magnetic head assembly 10 of FIG. 1 and the magnetic head assembly 30 of FIG. 2 are so similar in appearance that any differences between the two would be insignificant from the standpoint of achieving the object of the invention. The head assembly 30, however, has several features which are lacking from the head assembly 10 of FIG. 1 and which serve alone and in combination with each other to provide improved recording/playback performance through lower spacing losses.

Figure 1:
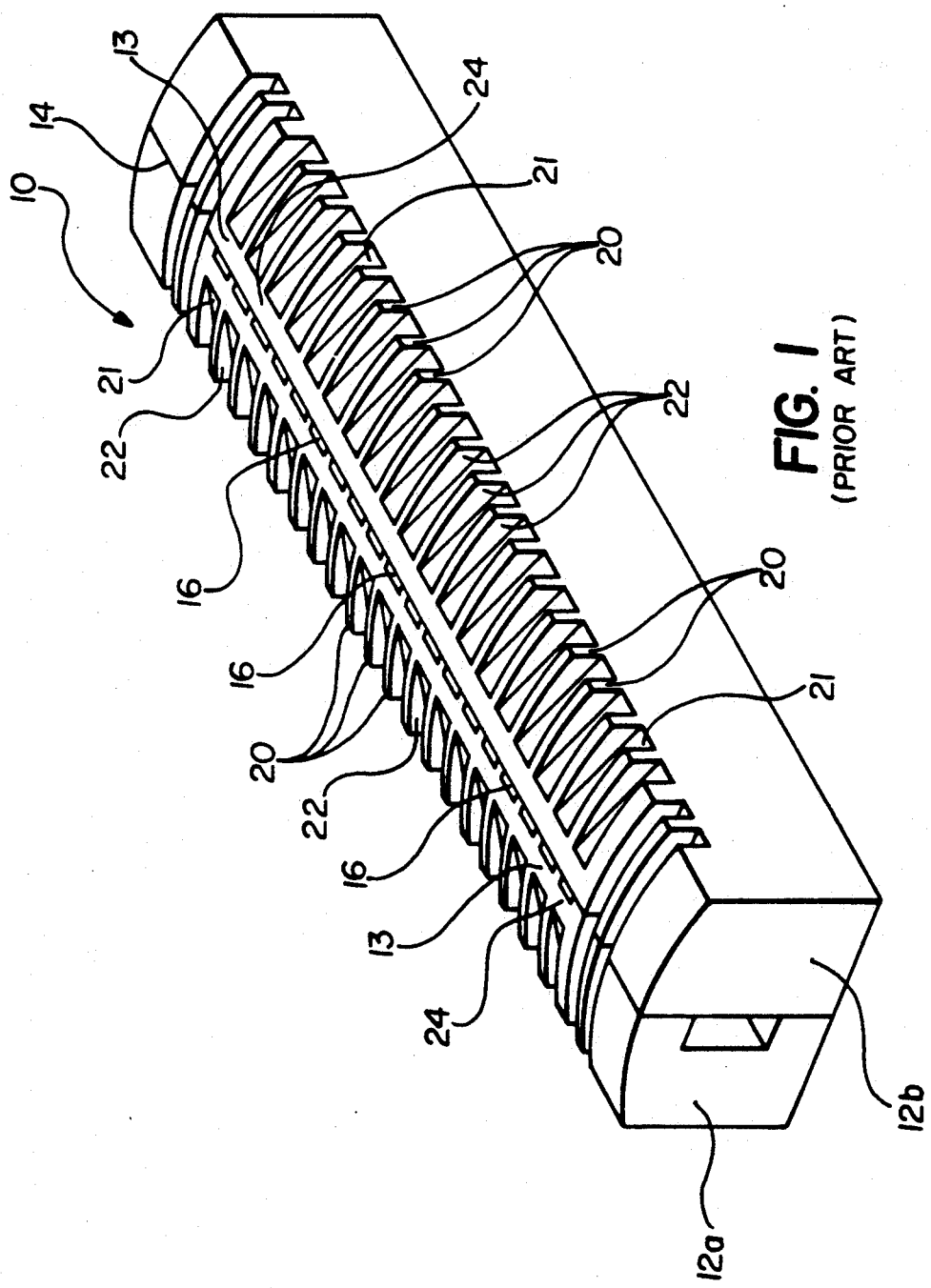
FIG. 1 is a perspective view of a multitrack magnetic head assembly known in the art.

An upwardly facing surface 32 of the head assembly 30, like the head assembly 10 of FIG. 1, includes a series of coplanar ribs alternating with inclined low-pressure channels on each side of an interface common to two half-sections. In FIG. 2, the ribs, the channels and the interface, and the two half-sections are denoted, respectively, 34, 35 and 36, and 38 and 40. The tape-engaging surface 42 of the ribs 34, however, unlike the top surface of the ribs 20 of FIG. 1, is gently curved in each of two orthogonal directions. More specifically, the tape-engaging surface 42 of each rib 34 is gently curved with a radius of curvature $R_1$ in a direction orthogonal to the interface 36; additionally, each rib 34 is gently curved with a radius of curvature $R_2$ in a direction parallel with the interface 36. That is, the curvature $R_2$ is orthogonal to the curvature $R_1$.

The head assembly 30, like the assembly 10 of FIG. 1, includes a plurality of magnetic heads arranged in a side-by-side configuration along a central elongated land, with their respective transducing gaps substantially in alignment with the interface common to the two half-sections. (In FIG. 2 the heads are denoted 44 and the elongated land 45.) A second distinguishing feature of the head assembly 30 is that each magnetic head 44 is situated in the land 45 in alignment with opposing ribs 34, instead of being in alignment with opposing channels as is the case with the head assembly 10 of FIG. 1. In other words, the series of ribs 34 on one side of the elongated land 45 is aligned with the series of ribs 34 on the opposite side of the land, with a magnetic head 38 located between and in alignment with each opposing pair of ribs.

We have found that continuous head-to-tape contact is controlled to a large extent by the width of each rib 34, and also by the radii $R_1$ and $R_2$. More specifically, we have found that "flying height" decreases as the width of each rib is narrowed or made thinner. The radius of cross-curvature $R_2$ is maximum at the apex of the curvature and continuously decreasing going away from the apex, whereas the radius of curvature $R_1$ is constant.

Preferably, curvatures $R_1$ and $R_2$ are produced by a diamond tape lapping process. With that technique, diamond tape is wrapped around the crown of each rib 34. In order to obtain sufficient tape lapping pressure, however, it is important that the elongated land 45 is as narrow as is practical so that it does not support the lapping tape excessively. This problem is especially acute if the tape-engaging surface 32 is of an exceptional hardness, as is the case with aluminum oxide and titanium carbide ceramic, the presently preferred materials for the surface 32.

Accordingly, opposing pairs of channels 35 are arranged so that only a narrow land separates their "shallow" ends from each other. In other words, each channel 35 is situated so that its "shallow" end intersects the tape engaging surface 32 immediately adjacent the interface 36. In a presently preferred embodiment of the invention, the width of each rib 34 is approximately 125 microns ($\mu$), the width of the land 45 is approximately 100 $\mu$, and the curvatures $R_1$ and $R_2$ are, respectively, 12.5 mm and 19–40 mm. With that embodiment, we have found that head-to-tape contact occurs with the following tape and operating conditions:

| tape | |
| --- | --- |
| width | 0.635 cm |
| thickness | 12.5$\mu$ |
| tension | 51 grams |
| speed | 152.4 cm/sec |

FIG. 3 is an elevation view of head assembly 30 looking in the direction of tape travel. As shown, the land 45 between adjacent magnetic heads 44 (the area between adjacent ribs 34) is of concave shape, and is contiguous with the shallow end of the two opposing channels 35 on each side thereof. This concave shape results from lapping tape wrapped under pressure around the crown of each rib 34 to obtain the cross-curvature $R_2$. Each concave region and its associated pair of contiguous channels 35 serve advantageously to cooperatively form a low-pressure continuous trough, from the leading edge to the trailing edge of the head assembly 30 in the direction of tape travel, i.e. in the direction orthogonal to the interface 36. The series of continuous troughs between opposing pairs of adjacent ribs 34 has been found to allow debris to flow through the interface without being collected at the edges of the end channel, thereby preventing such debris from interfering with contact between each magnetic head 38 and tape. In the presently preferred embodiment, the depth of each concave region is 0.8 to 1.6 μm.

Figure 4A:
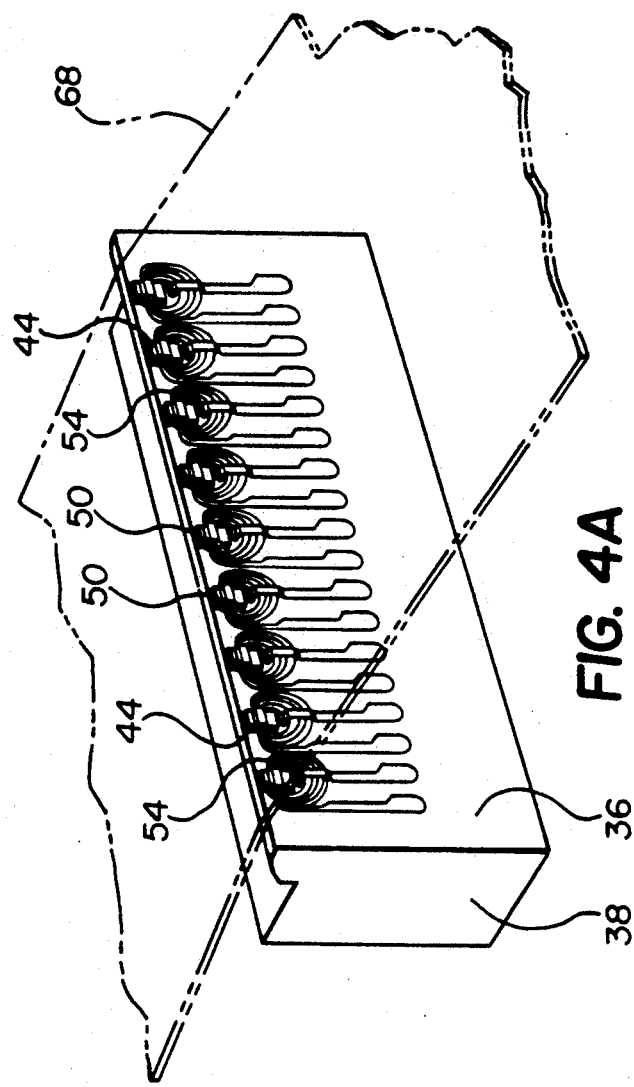
FIG. 4A is a perspective view of a section of a preferred embodiment of a multitrack head assembly according to the invention showing a plurality of thin film heads mounted in a side-by-side configuration.

With a land 45 having a width on the order of only 100 μ, it is preferred that each magnetic head 44 is of the thin film type. The perspective view of FIG. 4A shows the magnetic heads 44 of thin film construction mounted side by side at the interface 36 of the half-section 38. Each thin film coil 54, which as shown is wider than the corresponding pole tips 50, is located at the interface 36 beneath the concave region (also not shown) on each side of the corresponding pair of opposed ribs.

Figure 4B:
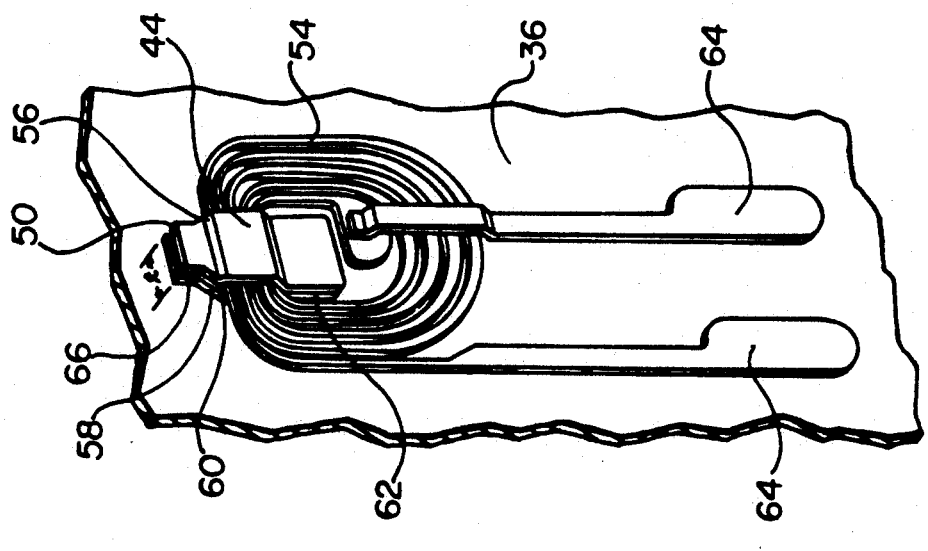
FIG. 4B is an enlarged perspective view showing one of the thin film heads of FIG. 4A.

FIG. 4B is an enlarged perspective view of one of the thin film heads 44 deposited on the half-section 38. Each head 44 includes a bifurcated magnetic core 56 comprised of a first pole piece 58 deposited on the half-section 38 and a second pole piece 60 superimposed on the pole piece 58. The two pole pieces are joined together at the base 62 of the core 56 for magnetic continuity. Prior to joining the two pole pieces together, however, the aforementioned coil 54 is deposited on the half-section 38 so that the coil can encircle the base 62 of the core 56. As shown, the two ends of the coil 54 are electrically connected to respective bonding pads 64, disposed on the half-section 38 so as not to short-circuit individual turns of the coil 54. The bonding pads serve, of course, for coupling electronic record/playback circuitry (not shown) to the coil 54.

Each pole piece may be formed of a magnetic material such as permalloy, or may be of laminated construction, preferably comprised of thin layers of a magnetically permeable material alternating with even thinner layers of an electrically insulating material. The upper ends or tips 50 of the pole pieces 58 and 60 are closely spaced parallel to each and define a magnetic transducing gap 66 therebetween which is substantially parallel with the interface 36. As is conventional in the art, the length of the gap 66 is the distance between the two pole pieces, whereas the width of the gap is the left-to-right dimension, denoted t in the drawing. The width t of the gap 66, which as disclosed previously herein is substantially the same as the width of the rib with which it is aligned, corresponds to the width of a record track along the length of the magnetic gap 68, shown in phantom in FIG. 4A.

Relative to ferrite magnetic heads of the ring type, thin film heads offer significant improvements in permeability and frequency response, thereby allowing higher data transfer rates. Furthermore, a thin film head fabricated of a magnetic core material such as permalloy has a higher saturation flux density than do conventional ferrites such as NiZn and MnZn. A high saturation flux density makes it possible to produce stronger recording fields, thereby making it feasible to utilize a high coercivity recording medium which is necessary for high-density (short-wavelength) recording.

The invention has been described in detail with reference to the figures; however, it will be appreciated that variations and modifications are possible within the spirit and scope of the invention.

What is claimed is:

1. A multitrack magnetic head assembly including a plurality of spaced magnetic heads arranged side-by-side extending across an upwardly facing surface which includes a first series and a second series of elongated parallel ribs alternating with open-ended low pressure channels on opposing sides of said transducing gap line, with said parallel ribs in each series being orthogonal to said transducing gap line, characterized by:
    a. said first series and said second series of parallel elongated ribs being aligned with said plurality of magnetic heads, said elongated ribs being coplanar with each rib having a curved tape-engaging surface of radius of curvature $R_1$ in the direction orthogonal to said transducing gap line and further being curved with a radius of curvature $R_2$ in a direction substantially parallel with said transducing gap line; and
    b. said upwardly facing surface also includes a region of concave shape situated substantially between said parallel elongated ribs and between adjacent magnetic heads along said transducing gap line.

2. A multitrack magnetic head assembly as defined in claim 1, characterized by an open-ended channel on each side of said gap line having an end continuous with a corresponding one of said concave regions.

3. A multitrack magnetic head assembly as defined in claim 2, characterized by each concave region and its associated pair of contiguous channels forming a continuous low-pressure trough extending from the leading edge to the trailing edge of said head assembly in the direction orthogonal to said transducing gap line.

* * * * *